(12) United States Patent
Albrecht et al.

(10) Patent No.: US 7,667,929 B2
(45) Date of Patent: Feb. 23, 2010

(54) APPARATUS, METHOD AND SYSTEM FOR FABRICATING A PATTERNED MEDIA IMPRINT MASTER

(75) Inventors: Thomas R. Albrecht, San Jose, CA (US); Henry H. Yang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 45 days.

(21) Appl. No.: 11/098,628

(22) Filed: Apr. 4, 2005

(65) Prior Publication Data
US 2006/0222761 A1    Oct. 5, 2006

(51) Int. Cl.
*G11B 23/00*    (2006.01)

(52) U.S. Cl. .......................... 360/131; 360/16; 360/18; 360/48; 427/127; 427/282; 428/826; 428/836.2

(58) Field of Classification Search ............. 360/15–18, 360/31, 48, 131
See application file for complete search history.

(56) References Cited

U.S. PATENT DOCUMENTS

| | | | |
|---|---|---|---|
| 4,321,282 A | | 3/1982 | Johnson |
| 4,469,719 A | * | 9/1984 | Martin ...................... 427/255.5 |
| 4,776,938 A | * | 10/1988 | Abe et al. ............... 204/192.15 |
| 4,814,056 A | * | 3/1989 | Welty .................... 204/298.11 |
| 4,935,278 A | | 6/1990 | Krounbi et al. |
| 5,185,055 A | | 2/1993 | Temple et al. |
| 5,641,611 A | * | 6/1997 | Shieh et al. ................. 430/321 |
| 5,953,587 A | * | 9/1999 | Forrest et al. ................. 438/99 |
| 6,042,998 A | | 3/2000 | Brueck et al. |
| 6,217,730 B1 | * | 4/2001 | Nakajima et al. ...... 204/298.11 |
| 6,313,905 B1 | * | 11/2001 | Brugger et al. ................ 355/55 |
| 6,367,414 B2 | * | 4/2002 | Witzman et al. ...... 118/723 VE |
| 6,411,459 B1 | | 6/2002 | Belser et al. .................. 360/75 |
| 6,420,058 B1 | | 7/2002 | Haratani et al. |
| 6,423,239 B1 | * | 7/2002 | Cathey et al. ................. 216/11 |

(Continued)

FOREIGN PATENT DOCUMENTS

EP     0556839     2/1993

(Continued)

OTHER PUBLICATIONS

Gyuman Kim, et al., Photoplastic Shadow-Masks for Rapid Resistless Multi-Layer Micropatterning, The 11$^{th}$ International Conference on Solid-State Sensors and Actuators, Munich Germany, Jun. 10-14, 200, p. 1632-1635.

(Continued)

*Primary Examiner*—Dismery E Mercedes
(74) *Attorney, Agent, or Firm*—Kunzler Needham Massey & Thorpe

(57) ABSTRACT

An apparatus, system, and method are disclosed for fabricating a patterned media imprint master. A substrate and a deposition mask may be fixably attached by an intervening spacing element, such that the substrate and deposition mask act as a unified element during a deposition process. A deposition mask may include a plurality of apertures generated by a conventional lithographic process. Material may be deposited onto the substrate through the deposition mask from more than one deposition source oriented at a unique deposition angle. A resulting substrate deposition pattern thus exhibits a density greater than a deposition mask aperture density while avoiding deposition pattern distortion.

19 Claims, 14 Drawing Sheets

U.S. PATENT DOCUMENTS

| | | |
|---|---|---|
| 6,451,508 B1 | 9/2002 | Bukofsky et al. |
| 6,511,791 B1 | 1/2003 | Bukofsky et al. |
| 6,719,841 B2 | 4/2004 | Chen et al. |
| 6,731,446 B2 * | 5/2004 | Ikeda et al. ............ 360/59 |
| 6,821,348 B2 * | 11/2004 | Baude et al. ............ 118/720 |
| 6,846,517 B2 * | 1/2005 | Chang et al. ............ 427/282 |
| 6,897,164 B2 * | 5/2005 | Baude et al. ............ 438/780 |
| 7,115,168 B2 * | 10/2006 | Grantham et al. ............ 118/720 |
| 7,236,324 B2 * | 6/2007 | Albrecht et al. ............ 360/75 |
| 2002/0076847 A1 * | 6/2002 | Yamada et al. ............ 438/34 |
| 2003/0008099 A1 | 1/2003 | Nishikawa et al. |
| 2003/0029831 A1 * | 2/2003 | Kawase ............ 216/27 |
| 2003/0151118 A1 * | 8/2003 | Baude et al. ............ 257/620 |
| 2004/0086639 A1 * | 5/2004 | Grantham et al. ............ 427/248.1 |
| 2004/0101713 A1 * | 5/2004 | Wachenschwanz et al. ............ 428/694 SG |
| 2004/0127012 A1 | 7/2004 | Jin |
| 2004/0150311 A1 | 8/2004 | Jin |
| 2004/0151947 A1 | 8/2004 | Rodmacq et al. |
| 2004/0156108 A1 | 8/2004 | Chou et al. |
| 2005/0066897 A1 * | 3/2005 | Pelhos et al. ............ 118/721 |
| 2005/0181316 A1 * | 8/2005 | Frodis et al. ............ 430/455 |

FOREIGN PATENT DOCUMENTS

| | | |
|---|---|---|
| EP | 0962547 | 8/2002 |
| JP | 2042723 | 2/1990 |
| JP | 4176021 | 6/1992 |
| WO | 003/002247 | 1/2003 |

OTHER PUBLICATIONS

Roli Lüthi, et al., Parallel Nanodevice Fabrication Using A Combination of Shadow Mask and Scanning Probe Methods, Applied Physics Letters vol. 75, No. 9, p. 1314-1316.

S. Landis et al., "Realization and characterization of magnetic media deposited on side edge of patterned silicon dot arrays," Microprocesses and Nanotechnology Conference, 2003. Digest of Papers. 2003 International, pp. 60-61.

S.E. Lambert, "Beyond discrete tracks: Other aspects of patterned media," J. Appl. Phys.69 (8), Apr. 15, 1991, pp. 4724-4726.

"Magnetically Discrete but Physically continuous Recording Tracks," IBM Technical Disclosure Bulletin, Oct. 1975, p. 1641-1642.

Petrashov, "Nanofabrication Using Self Narrowing Atomic Beams", Microelectronic Engineering vol. 35, Feb. 1997, pp. 357-359.

Cheng et al., "Formation of a Cobalt Magnetic Dot Array via Block Copolymer Lithography", Advanced Materials, vol. 13, No. 15, Aug. 3, 2001, pp. 1174-1178.

* cited by examiner

| | Density | $D$ | 500 Gbit/in$^2$ |
|---|---|---|---|
| | Pattern spot spacing | $q$ | 38.6 nm |
| | Number of deposition angles | $N$ | 3 |
| 802 | Mask hole spacing | $s$ | 66.9 nm |
| | Source center offset | $R$ | 22.3 nm |
| 804 | Spot center offset from hole center | $r$ | 22.3 nm |
| 808 | Hole/spot diameter | $d$ | 25.7 nm |
| 900 | Height of shadow mask above substrate | $h$ | 500 nm |
| 902 | Height of source above shadow mask | $z$ | 50 cm |
| | Deposition angle from center axis of hole | $\theta$ | 2.55 degrees |
| 1100 | Source width | $w$ | 2 nm |
| 1000 | Shadow mask thickness | $t$ | 80 nm |
| | Narrowing of spot width | $\Delta d$ | 3.6 nm |
| 1104 | Width of penumbra | $p$ | 2.0 nm |
| 1102 | Aperture width in blocking plate | $u$ | 4.0 mm |

Fig. 13

APPARATUS, METHOD AND SYSTEM FOR FABRICATING A PATTERNED MEDIA IMPRINT MASTER

BACKGROUND OF THE INVENTION

1. Field of the Invention

This invention relates to an apparatus, method and system for defining a pattern on a substrate and more particularly relates to an apparatus, method and system for fabricating a patterned media imprint master having increased data track density.

2. Description of the Related Art

Nearly every computer in use today uses one or more hard disk drives to store changing digital information in a relatively permanent form. Hard disk drives are also becoming increasingly pervasive in media players, digital recorders, and other personal devices.

Hard disks typically comprise high precision aluminum or glass disks coated on both sides with a special thin film media designed to store information in the form of magnetic patterns. The disks are rotated at high speeds, and electromagnetic read/write heads are used to either record information onto the thin film media, or read information from it.

Thin film media employed in hard disk drives typically comprise a thin, continuous layer of magnetic grains that may be magnetized in a particular orientation by a strong magnetic field. A read/write head, for example, can record information by creating a local magnetic field that orients a cluster of grains, known as a bit, in one direction or the other. To increase the capacity of disk drives, manufacturers are continually striving to reduce the size of bits and the grains that comprise the bits.

The ability of individual magnetic grains to be magnetized in one direction or the other, however, poses problems where grains are extremely small. The superparamagnetic effect results when the product of a grain's volume (V) and its anisotropy energy ($K_u$) fall below a certain value such that the magnetization of that grain may flip spontaneously due to thermal vibrations. Where this occurs, data stored on the disk is corrupted. Thus, while it is desirable to make smaller grains to support higher density recording with less noise, grain miniaturization is inherently limited by the superparamagnetic effect.

In response to this problem, engineers have developed patterned media, where the magnetic thin film layer is created as an ordered array of highly uniform islands, each island capable of storing an individual bit. Each bit may be one grain, or several exchange coupled grains, rather than a collection of random decoupled grains. In this manner, patterned media effectively reduces noise by imposing sharp magnetic transitions at well-defined pre-patterned positions.

Indeed, since patterned media allows data to be stored in pre-patterned islands containing a single grain or a small number of grains, rather than the much larger number of random grains required in conventional media, patterned media effectively circumvents the density limitations imposed by the superparamagnetic effect, extending by at least an order of magnitude the range of densities at which thermal stability is achieved. Despite the advantages of such media, however, cost-effective methods of mass producing patterned media have not been shown.

One method used to produce patterned media comprises the steps of: (1) creating a physical master pattern of features on a substrate; (2) replicating the features of the master pattern in a resist pattern on a disk substrate using nanoimprint lithography; (3) transferring the pattern into the disk substrate by etching; and (4) blanket depositing a magnetic and overcoat layer on the patterned disk substrate. Creation of the master pattern for densities in the range of 1 Terabit/square inch and beyond is difficult to achieve by conventional lithographic techniques such as optical or e-beam lithography because the features are too small to be compatible with either of these techniques. Thus, for hard disks to realize the potential densities that patterned media may provide, a master pattern generation process is needed to generate features in the required density range.

Although methods have been proposed for overcoming some of the density limitations of conventional lithographic manufacturing methods generally, such methods are not readily applicable to disk drive technology. For example, tight position tolerances resulting from track-following servo requirements as well as read and write channel clocking requirements limit the usefulness of proposed self-assembly processes, where molecules spontaneously organize into well-defined aggregates. Also, known lithographic processes for manufacturing disks are both time and labor intensive, making such processes costly and generally impractical for high volume media fabrication.

Accordingly, a need exists for a practical, attainable apparatus, system, and method for increasing storage density in patterned media. Beneficially, such an apparatus, system and method would increase media data storage capabilities, maintain precise data position control, and increase media data resolution while limiting expenses traditionally associated with patterned media fabrication. Such apparatuses, systems and methods are disclosed and claimed herein.

SUMMARY OF THE INVENTION

The present invention has been developed in response to the present state of the art, and in particular, in response to the problems and needs in the art that have not yet been fully solved by currently available apparatus, methods and systems for fabricating patterned media. Accordingly, the present invention has been developed to provide an apparatus, system, and method for fabricating patterned media that overcome many or all of the above-discussed shortcomings in the art.

The apparatus to fabricate patterned media in accordance with certain embodiments of the present invention is provided with a substrate coupled to a deposition mask. In some embodiments, the apparatus may further include a spacing element removably coupled to the substrate and the deposition mask. The spacing element may maintain a substantially fixed relationship between the substrate and the deposition mask to facilitate their function as a cohesive unit.

The apparatus, in one embodiment, provides a plurality of apertures in the deposition mask to direct a material onto the substrate. At least one deposition source may be provided to deposit the material through the plurality of apertures at various deposition angles to produce substantially concentric recording regions having a density greater than the plurality of apertures. In certain embodiments, more than one deposition source may be oriented at a unique deposition angle relative to the substrate such that at least two deposition locations correspond to every aperture in a deposition mask. The material may be deposited from the at least one deposition source either sequentially or simultaneously from the deposition sources to produce the deposition locations. Alternatively, a single deposition source may be sequentially oriented at various deposition angles to form at least two deposition locations corresponding to each aperture in the deposition mask. In certain embodiments, an aperture in a deposition mask may include at least one angled sidewall to avoid interference with a stream of material from a deposition source, thereby facilitating a uniform deposition pattern on the substrate.

The apparatus, in one embodiment, further includes a shield proximate the deposition mask to constrain a variance in deposition angle of a stream of material from a deposition source. The shield may include a substantially radial aperture corresponding to a substantially narrow surface area of the substrate and deposition mask. In some embodiments, a rotational element may rotate the substrate as material is deposited through the shield onto the substrate. In this manner, substantially concentric recording regions may be formed on the substrate, where each recording region substantially corresponds to a unique radial position. In some embodiments, substantially concentric recording regions formed in accordance with the present invention may occupy an entire substrate surface area.

A system of the present invention is also presented to fabricate patterned media. The system may be embodied by a deposition assembly that includes a substantially planar substrate coupled to a deposition mask. The deposition mask may have a plurality of apertures integrated therein to direct a deposition material onto the substrate. The system may further include at least one deposition source adapted to deposit the deposition material through the plurality of apertures at various deposition angles to produce substantially concentric recording regions having a density greater than the plurality of apertures. A rotational element and shield element may be provided to rotate the deposition assembly during deposition, and to constrain a variance in the various deposition angles.

A method of the present invention is also presented for fabricating patterned media. The method in the disclosed embodiments substantially includes the steps to carry out the functions presented above with respect to the operation of the described apparatus and system. In one embodiment, the method includes providing a substantially planar substrate, providing a deposition mask having a plurality of apertures adapted to direct a deposition material onto the substrate, and fixably coupling the substrate to the deposition mask. The substrate in one embodiment may be etchable. The method may also include directionally depositing the deposition material through the plurality of apertures at various deposition angles to form on the substrate substantially concentric recording regions having a density greater than the plurality of apertures. Finally, the method may include detaching the substrate from the deposition mask.

In a further embodiment, the method may include removing a substantial portion of an intermediate layer between the substrate and the deposition mask, leaving a sparse array of support structures to fixably couple the substrate to the deposition mask. Further, in some embodiments, a method in accordance with the present invention may include etching the substrate to produce data tracks substantially corresponding to the substantially concentric recording regions and substantially eliminating the deposition material from the substrate.

In certain embodiments, directionally depositing the deposition material may include depositing the material from at least one substantially oblique angle of incidence. In addition, directionally depositing the deposition material may include rotating the substrate and/or constraining a variance in the various deposition angles of the deposition material. To this end, some embodiments of the method may include providing a shield substantially adjacent the deposition mask and disposing within the shield a substantially narrow aperture corresponding to a portion of the substrate such that upon rotation of the substrate, adjacent portions of the substrate may be sequentially exposed to the material to create the substantially concentric recording regions.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 13 is a table that sets forth values for the operational parameters of the system illustrated in FIGS. 8–12.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are disclosed to provide a thorough understanding of embodiments of the present invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As used in this specification, the term "patterned media imprint master" or "imprint master" refers to a substrate having reproducible topographic features. In some embodiments, positive replication of such topographic features may be accomplished according to a two generation nanoimprint replication process, where multiple daughter stampers are replicated from the imprint master, and multiple patterned media substrates are reproduced from each daughter stamper. The term "recording region" refers to a substantially circular deposition pattern formed by the deposition process of the present invention and used to produce a corresponding data track on patterned media that is capable of storing magnetic data.

Figure 1:
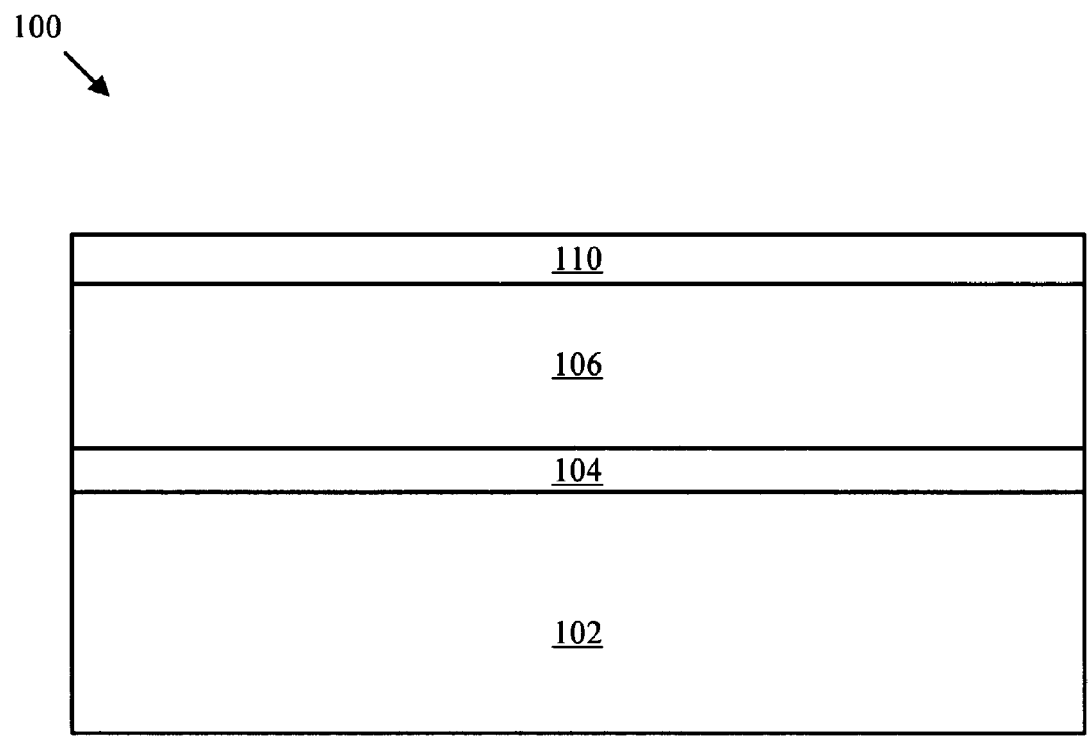
FIG. 1 is a cross-sectional view of one embodiment of an apparatus for fabricating a patterned media imprint master in accordance with the present invention.
Figure 2:
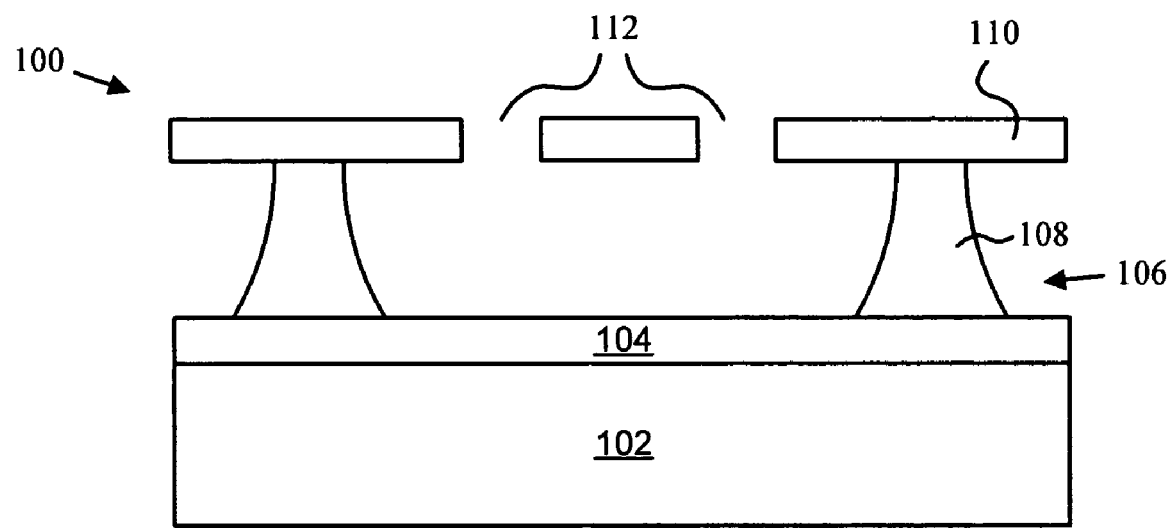
FIG. 2 is a cross-sectional view of an alternative embodiment of an apparatus for fabricating a patterned media imprint master in accordance with the present invention.

Referring now to FIGS. 1 and 2, an apparatus for fabricating a patterned media imprint master in accordance with the present invention may comprise a deposition assembly 100 having a substrate layer 102, an intermediate layer 106, and a deposition mask layer 110. In certain embodiments, as best depicted by FIG. 1, each layer is integral to a unitary whole. Alternatively, each layer may be independent with respect to each other layer.

A substrate layer 102, or substrate, may generally comprise a substantially rigid body with a flat surface large enough to contain the master pattern for the full disk surface. The substrate 102 may comprise, for example, a silicon wafer, or a disk substrate made of aluminum-magnesium alloy, glass, ceramic, or any other material known to those in the art. Since e-beam lithography may be performed on the surface of the substrate 102, the substrate 102 may include a conducting material such as doped silicon or metal, or be coated with a suitable conducting layer.

In some embodiments, a substrate 102 includes a substantially smooth etchable ground layer 104 having a chemistry capable of using deposited material as an etch mask. The ground layer 104 may further comprise a material able to withstand an etch process to which an overlying intermediate layer 106 is subjected. A ground layer 104 may comprise, for example, silicon nitride or other material known to those in the art. Alternatively, a substrate 102 itself may comprise a material such as silicon that is substantially smooth, etchable, and able to withstand an etch process to which an intermediate layer 106 is subjected.

An intermediate layer 106 may generally comprise a substantially rigid material that is both smooth and etchable, such as silicon or other similar material known to those in the art. An intermediate layer 106 may be susceptible to a gas phase etch process using an etchant such as $XeF_2$, and/or a wet etch process.

In certain embodiments, an intermediate layer 106 may be subjected to a gas phase etch process to produce spacing elements 108 capable of fixably attaching the substrate 102 to the deposition mask layer 110 while maintaining a substantially uniform distance therebetween. Spacing elements 108 may, for example, retain a deposition mask layer 110 at a height of approximately 1 μm above a surface of a substrate 102.

A deposition mask layer 110, or deposition mask, may comprise a substantially rigid material capable of maintaining a substantially parallel relationship relative to the substrate 102 while supported by the spacing elements 108. In certain embodiments, a deposition mask 110 may comprise a material capable of acting as an etch mask to the intermediate layer 106 such that the intermediate layer 106 may be subjected to an etch process to form the spacing elements 108. A deposition mask 110 may comprise, for example, silicon nitride, silicon dioxide, carbon, or any other such material known to those in the art.

Apertures 112 may be formed in a deposition mask 110 to allow material, ions, electrons, light and/or gas to pass through the deposition mask 110 to the intermediate layer 106 and/or substrate 102. Apertures 112 may be formed in a deposition mask 110 by optical or e-beam lithography, an etching process, a combination thereof, or by any other means known to those in the art. In certain embodiments, apertures 112 may be formed to include at least one angled sidewall. As discussed in more detail below with reference to FIG. 6, angled sidewalls enable a deposition mask 110 to exhibit greater thickness and thus increased structural integrity while avoiding interference with material deposited therethrough.

Figure 3:
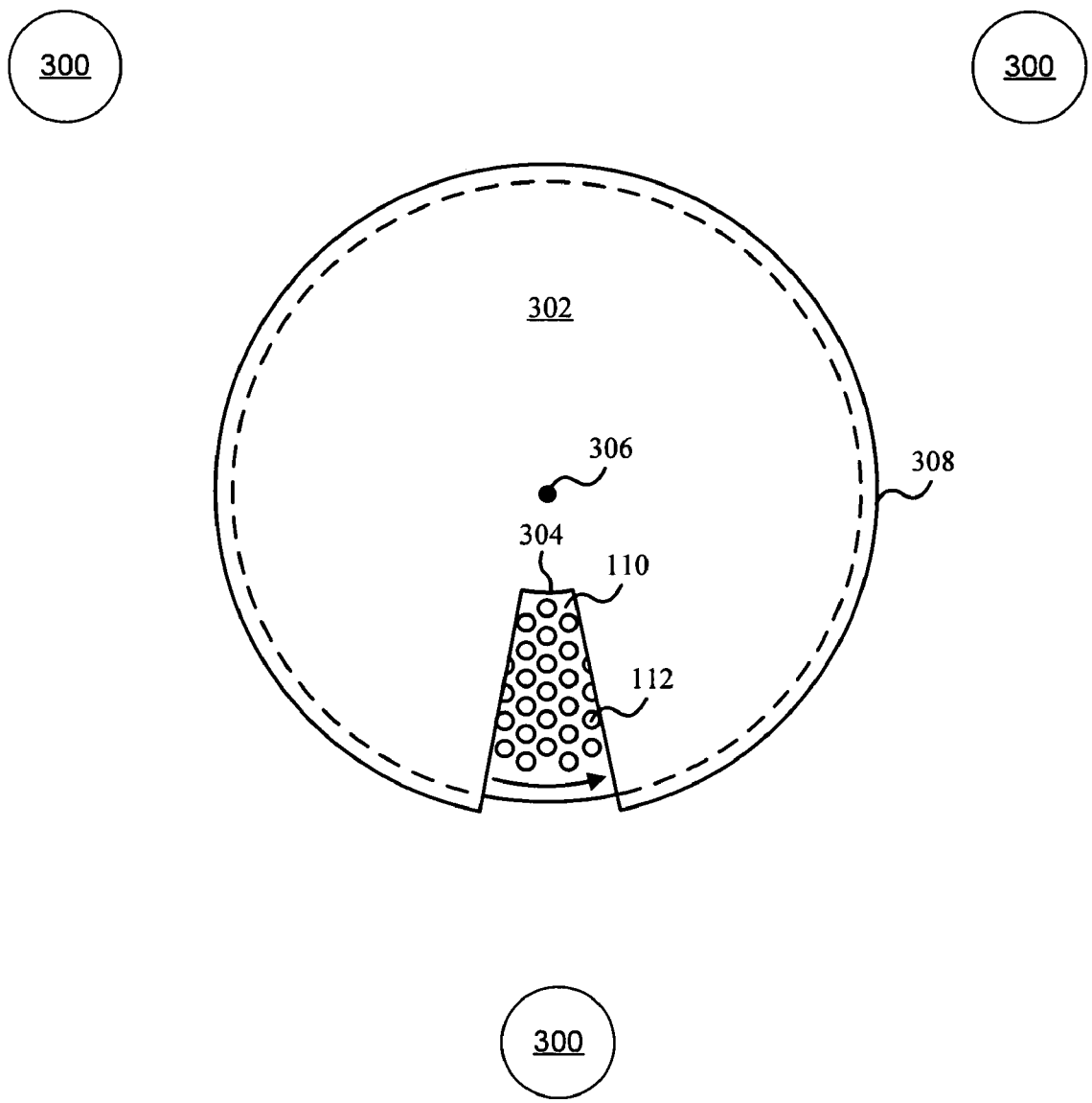
FIG. 3 is a bottom view of one embodiment of the system for fabricating a patterned media imprint master in accordance with the present invention.

Referring now to FIG. 3, a deposition material such as chromium, chromium-molybdenum alloy, aluminum, an aluminum alloy or other metal or other material known to those in the art may be deposited onto a substrate 102 through apertures 112 in the deposition mask 110 by physical vapor deposition techniques, such as evaporation, ion beam deposition, or directional sputtering. Such physical vapor deposition processes transport material in a vaporized state from a deposition source 300 to the target substrate 102. Vaporized material particles may condense onto the substrate according to a substantially collisionless line-of-sight transport.

A deposition source 300 in accordance with the present invention may comprise a cathode, a heated crucible, or any other device known to those in the art capable of retaining and projecting a directional stream of material toward a substrate 102. In certain embodiments, a plurality of deposition sources 300 reside at locations distanced from and at oblique angles of incidence to a substrate 102. In certain embodiments, deposition sources 300 are separated from the substrate 102 by a distance of at least 40 cm. The specific angles of incidence corresponding to each deposition source 300 may be calibrated to direct a stream of material to specific locations on the substrate 102, each location defined in part by an aperture 112 in the attached deposition mask 110. In this manner, the deposition sources 300 and apertures 112 in the deposition mask 110 cooperate to direct material to particular substrate 102 locations such that the resulting number of locations is a multiple of the number of apertures 112.

Alternatively, a single deposition source 300 may be oriented at various deposition angles sequentially, where deposition from each of the deposition angles constitutes one deposition cycle. Several deposition cycles may be implemented to facilitate uniformity of deposition locations resulting from each of the deposition angles. Indeed, deposition material may build up along a perimeter of a deposition mask aperture 112 during the deposition process, thus obscuring aperture 112 dimensions relative to aperture 112 dimensions existing prior to a first deposition process. Accordingly, deposition locations resulting from subsequent deposition angles may evidence reduced or obscured dimensions relative to a first deposition location. A deposition process that incorporates several deposition cycles, on the other hand, facilitates deposition location uniformity by distributing the effect of obscured aperture 112 dimensions across all resulting deposition locations.

In certain embodiments, a system for fabricating a patterned media imprint master in accordance with the present invention includes a shield 302 to facilitate effective and accurate deposition of material at specific substrate 102 locations. For a given deposition angle, the shield 302 may be held in a fixed position relative to the deposition source 300 and the surface plane of the substrate 102. The purpose of the shield 302 is to restrict the range of angle of deposition material through apertures 112 in the deposition mask 110. In some embodiments, the substrate 102 may be rotated and/or translated relative to the fixed shield 302 to provide a means of depositing material over a larger substrate area than the size of an aperture 304 in the shield 302, as discussed in more detail below. A shield 302 may comprise a substantially rigid disk having dimensions at least slightly greater than dimensions corresponding to a substrate 102 such that the shield 302 may substantially cover an entire surface area of the substrate 102 when aligned therewith.

The shield 302 may include at least one aperture 304 disposed therein. The aperture 304 may function to isolate a portion of the substrate 102 retained proximate, and in some embodiments substantially aligned with, the shield 302. The aperture 304 may extend radially from a center 306 of the shield 302 to its perimeter 308, or may occupy any portion thereof. The dimensions of the aperture 304 may suffice to expose a plurality of deposition mask 110 apertures 112 to deposition material deposited from the deposition sources 300. In some embodiments, a length of the aperture 304 may accommodate every deposition mask 110 aperture 112 along a radius of a substrate 102 such that a single rotation of the substrate 102 with respect to the aperture 304 effectively coats an entire surface area of the substrate 102. Those skilled in the art will recognize, however, that more than one rotation of the substrate 102 may be used to deposit deposition material on a surface thereof.

In some embodiments, dimensions of the aperture 304 may increase in a direction extending from the center 306 to the perimeter 308 in order to equalize the amount of material deposited at different radii on the rotating substrate 102. In certain embodiments, an aperture 304 may comprise a shape substantially corresponding to a trapezoid. Of course, those skilled in the art will recognize that an aperture 304 in accordance with the present invention may comprise any shape capable of isolating a portion of a substrate 102 in communication therewith, such as an isosceles triangle, a right triangle, a rectangle, a parallelogram, or any other shape known to those in the art.

Figure 4:
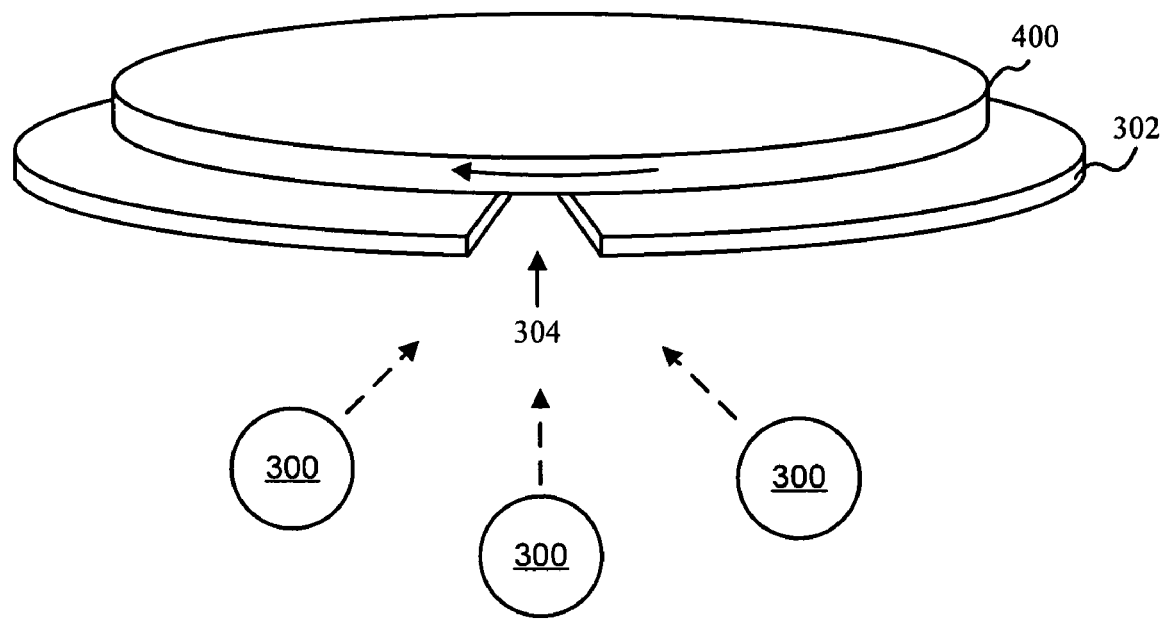
FIG. 4 is a cross-sectional view of the system for fabricating a patterned media imprint master of FIG. 3.

Referring now to FIG. 4, a system for fabricating a patterned media imprint master may further include a rotational element 400 comprising a rigid supportive disk capable of rotating with respect to a shield 302. The rotational element 400 may include a spindle (not shown) to substantially center and retain a substrate 102 and deposition mask 110 in accordance with the present invention. In certain embodiments, the rotational element 400 may lie substantially superjacent the shield 302 such that a portion of a substrate 102 disposed thereon may be exposed through the deposition mask 110 and shield 302 to a stream of deposition material originating from a deposition source 300 below. A rotational element 400 may include at least one spacer (not shown) to distance the rotational element 400 at least slightly from the shield 302 to promote unobstructed rotation. In some embodiments, the spindle may function as a spacer; alternatively, a spacer may be integral to or coupled to a surface of the rotational element 400.

A rotational element 400 and shield 302 in accordance with the present invention may cooperate to produce substantially concentric recording regions on the surface of the substrate 102. Specifically, as discussed in more detail with reference to FIG. 5 below, material deposited through apertures 112 in a deposition mask 110 by a plurality of deposition sources 300 oriented at unique angles of incidence may produce a plurality of deposition locations. Rotating the substrate 102 relative to a shield 302 aperture 304 during deposition may result in many deposition locations sharing the same radial position along a surface circumference. Such deposition locations may thus cooperate to form a substantially circular recording region. As apertures 112 disposed in the deposition mask 110 may correspond to a plurality of radial positions, substantially concentric recording regions on the surface of the substrate 102 may result by rotating the substrate 102 relative to the shield 302 aperture 304 in accordance with the present invention.

Figure 5:
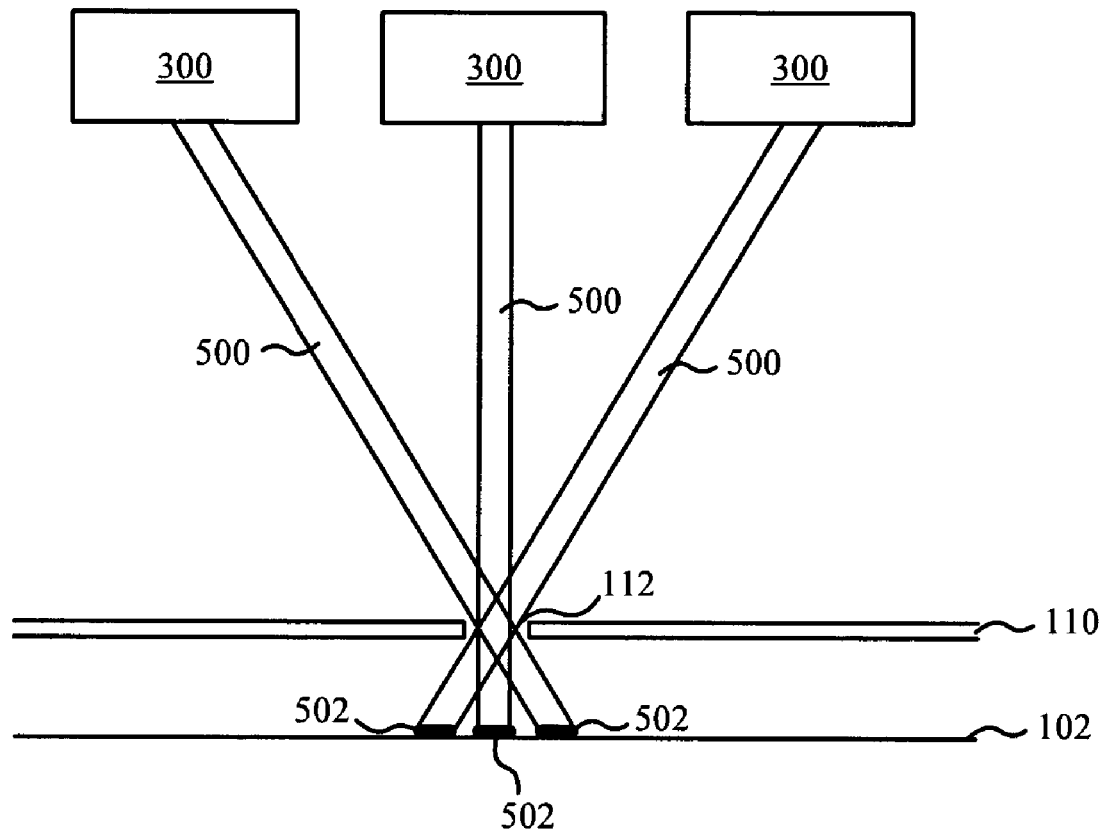
FIG. 5 is a cross-sectional view of one embodiment of a method for depositing material onto a substrate in accordance with the present invention.

Referring now to FIG. 5, in certain embodiments, a vacuum chamber may be used in connection with the present invention to facilitate effective and accurate deposition of material at specific substrate 102 surface locations. A vacuum chamber may enable variable deposition conditions, as well as heating and cooling capabilities.

As mentioned above with reference to FIG. 3, a deposition source 300 may be implemented to deposit deposition material 500 according to a specific angle of incidence. The specific angle of incidence at which deposition material 500 is deposited cooperates with a deposition mask 110 aperture 112 to define a specific deposition location 502. In this manner, several deposition sources 300 may be implemented to deposit deposition material 500 at unique angles of incidence to define more than one deposition location 502 per deposition mask 110 aperture 112. In selected embodiments, three deposition sources 300 oriented to deposit deposition material 500 at unique angles of incidence are implemented to define three specific deposition locations 502 for every deposition mask 110 aperture 112. A density of deposition locations 502 is thus tripled relative to a density of apertures 112.

Figure 6:
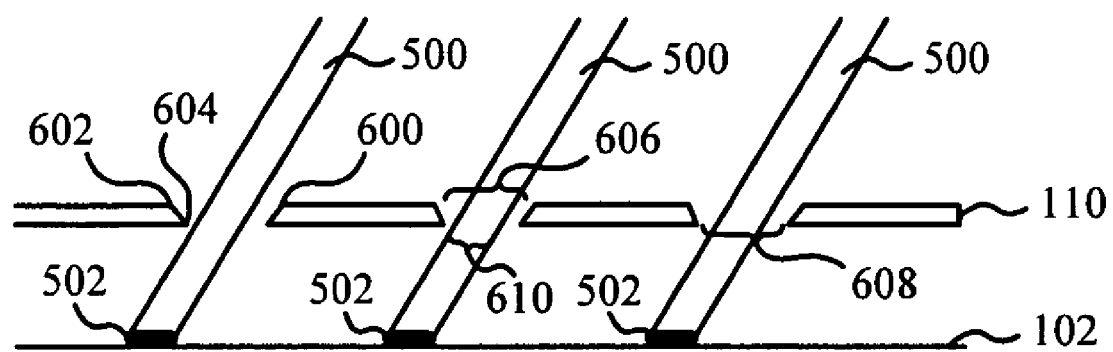
FIG. 6 is a cross-sectional view of an alternative embodiment of a method for depositing material onto a substrate in accordance with the present invention.

Referring now to FIG. 6, because a deposition mask 110 comprises a finite thickness, each aperture 112 within the deposition mask 110 comprises sidewalls 600 having a finite height. This finite height tends to distort a stream of deposition material 500 such that dimensions of a deposition location 502 may not correspond to dimensions of the stream of deposition material 500. Indeed, where a width 610 of a stream of deposition material 500 precisely corresponds to an aperture 112 width, orienting the stream of deposition material 500 at an angle of incidence relative to the aperture 112 may result in interference from either or both of the proximate 602 and distal 604 edges of the aperture 112, in effect reducing the dimensions of a resulting deposition location 502 from the dimensions of the original stream of deposition material 500.

To avoid such interference and dimension distortion, certain embodiments of the present invention include aperture 112 sidewalls 600 selectively angled such that a proximate aperture width 606 is substantially greater than a distal aperture width 608, such that the size and shape of the spot of material deposited on the substrate 102 is defined solely by the size and shape of the distal aperture 608 and no shadowing is caused by the proximate aperture width 606. Increasing the width 606 of the proximal aperture allows the thickness of the deposition mask 110 to be increased without causing shadowing by the proximal aperture; this allows the strength of the deposition mask 110 to be increased and reduces the number of spacing elements 108 needed.

To further alleviate deposition location 502 distortion, certain embodiments of the present invention contemplate depositing deposition material 500 from multiple angles of incidence simultaneously rather than sequentially to limit nonuniformity resulting from material 500 adhering to an aperture 112 during a previous deposition. The benefits of highly uniform deposition locations 502 resulting from simultaneous deposition, however, inherently rely on uniformity in operation between deposition sources 300. In other embodiments, deposition occurs sequentially from various deposition sources 300. In such embodiments, a desired thickness of a deposition location 502 may result gradually from successive deposition cycles to reduce an incidence of nonuniformity between deposition locations 502.

Figure 7:
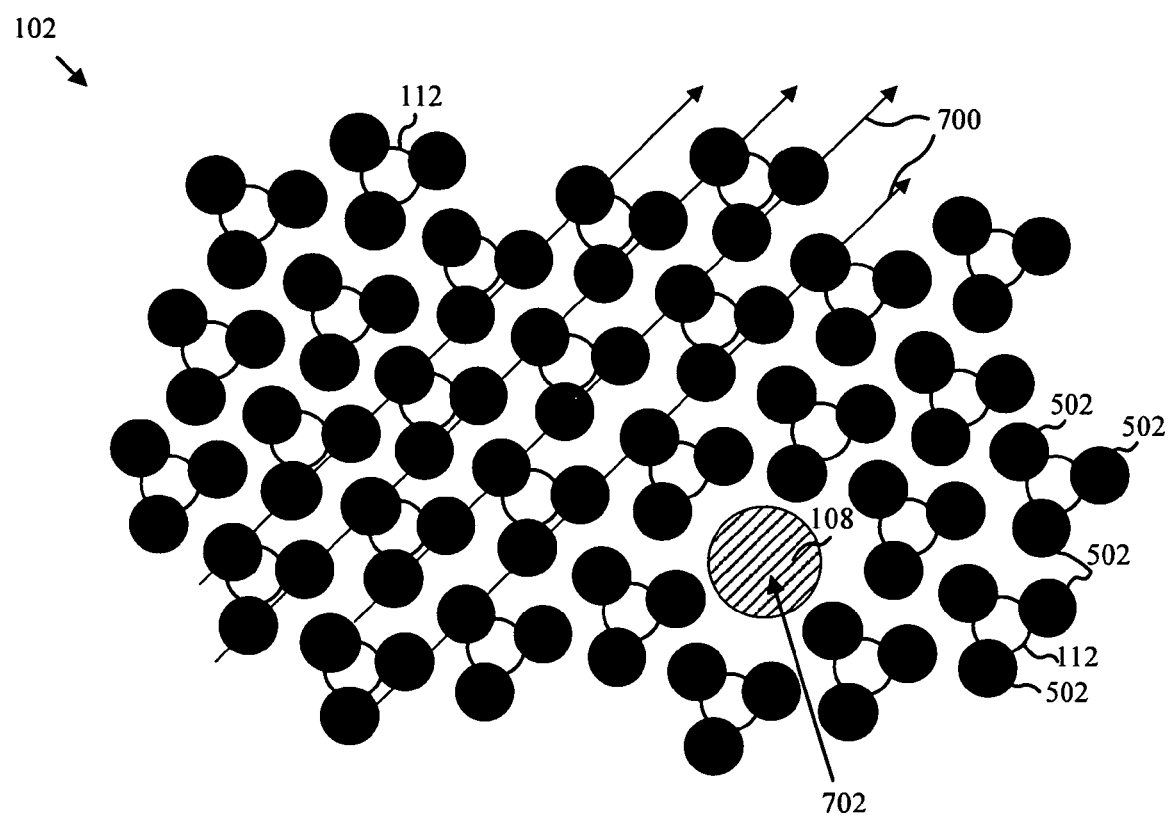
FIG. 7 is a top view of a substrate having material deposited thereon in accordance with certain embodiments of the present invention.
Figure 8:
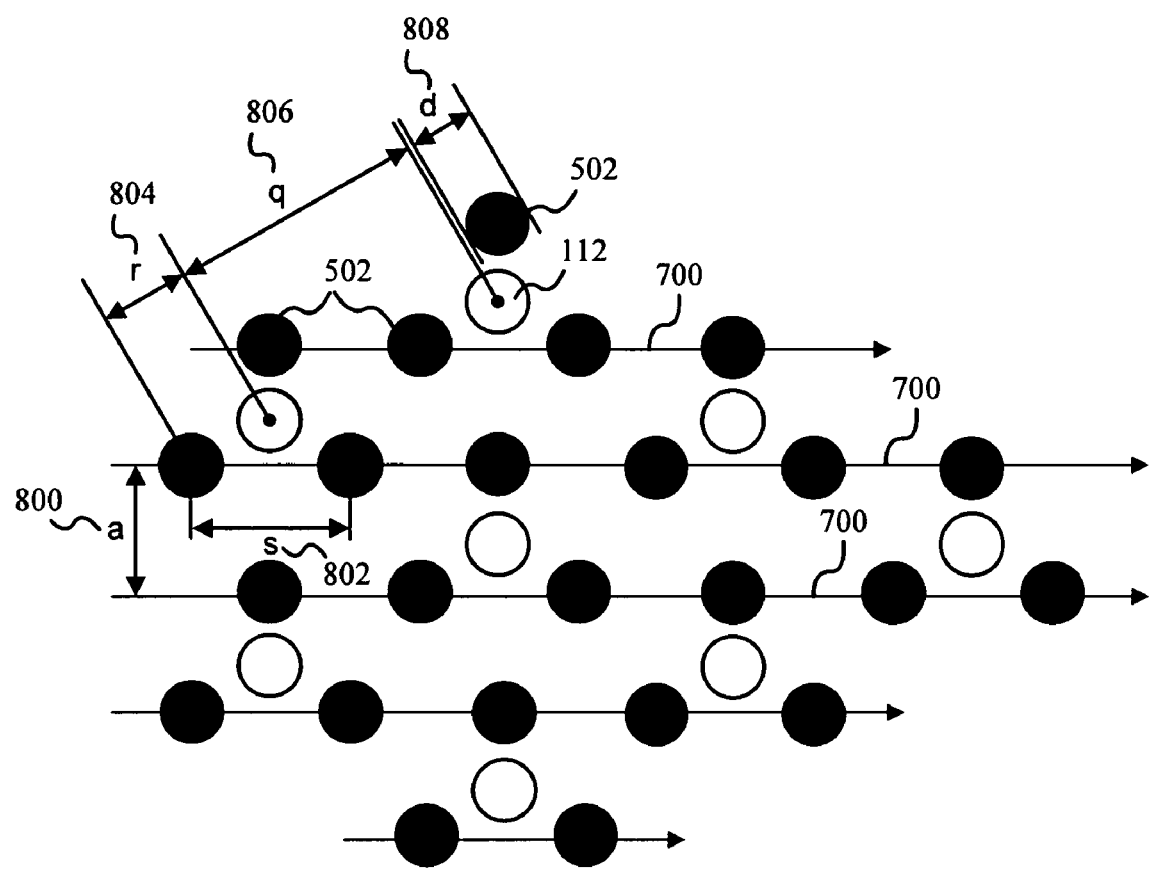
FIG. 8 is a top view of one exemplary embodiment of a deposition pattern formed on a substrate in accordance with the present invention.

Referring now to FIG. 7, a deposition assembly 100 in accordance with the present invention may facilitate fabricating patterned media having higher data track density than conventional patterned media by providing multiple substrate deposition locations 502 for every deposition mask aperture 112 created by conventional pattern techniques. Specifically, a quantity of deposition mask apertures 112 may combine with a height of a spacing element 108 and angles of deposition to create a plurality of deposition locations 502 corresponding to a single aperture 112.

In one embodiment of the present invention, as discussed previously with reference to FIG. 5, three deposition sources 300 are oriented to deposit deposition material onto a substrate 102 from three unique angles. In this manner, three unique deposition locations 502 correspond to a single deposition mask aperture 112. In certain embodiments, the orientations of the deposition sources 300 and the height of the spacing elements 108 cooperatively align deposition locations 502 into consistent, densely ordered track patterns 700.

As discussed previously with reference to FIGS. 1 and 2, a plurality of spacing elements 108 may be interspersed between the deposition mask 110 and the substrate 102 to support the deposition mask 110 above the surface of the substrate 102. In some embodiments, the spacing elements 108 are arranged in a regular pattern such that a device using patterned media fabricated in accordance with the present invention may be designed to ignore the small unusable areas 702 resulting from the spacing elements 108.

Referring now to FIGS. 8–13, and by way of example and not limitation, one embodiment of a system for fabricating a patterned media imprint master in accordance with the present invention may produce a hexagonal close-packed deposition pattern having an island density of 500 Gbit/in². Specifically, referring now to FIG. 8, a deposition mask 110 may include apertures 112 separated by a distance ("q") 806 to produce deposition locations 502 having a hexagonal close-packed geometry, where adjacent deposition locations 502 are separated by a space ("s") 802. In the present exemplary embodiment, the offset ("r") 804 of a deposition location 502 relative to an aperture 112 is equal to 0.58 s. The diameter ("d") 808 of a deposition location 502 may be equal to approximately 0.67 s and a track pitch ("a") 800 may be equal to approximately 0.87 s to achieve a suitable overall deposition pattern density.

Figure 9:
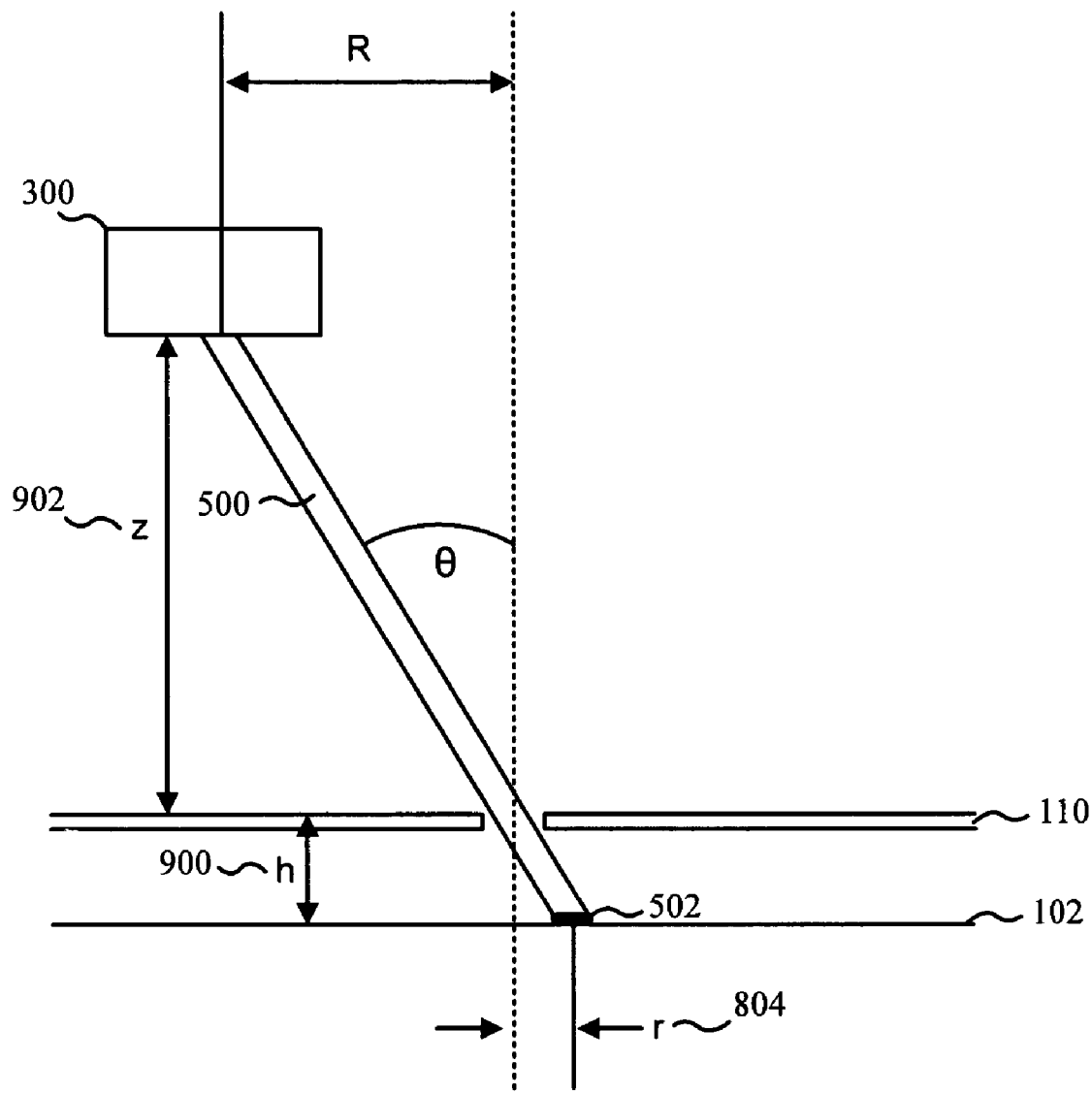
FIG. 9 is a cross-sectional view of the system used to form the deposition pattern of FIG. 8.

Referring now to FIG. 9, in the exemplary embodiment, a deposition source 300 may be located at a height ("z") 902 above a deposition mask 110, and the deposition mask 110 may be fixed at a height ("h") 900 above the substrate 102 to achieve a deposition location 502 having an offset ("r") 804. Specifically, to achieve an offset ("r") 804 equal to 22.3 nm, a height ("z") 902 may be fixed at 50 cm and a height ("h") 900 may be fixed at 500 mm.

Figure 10:
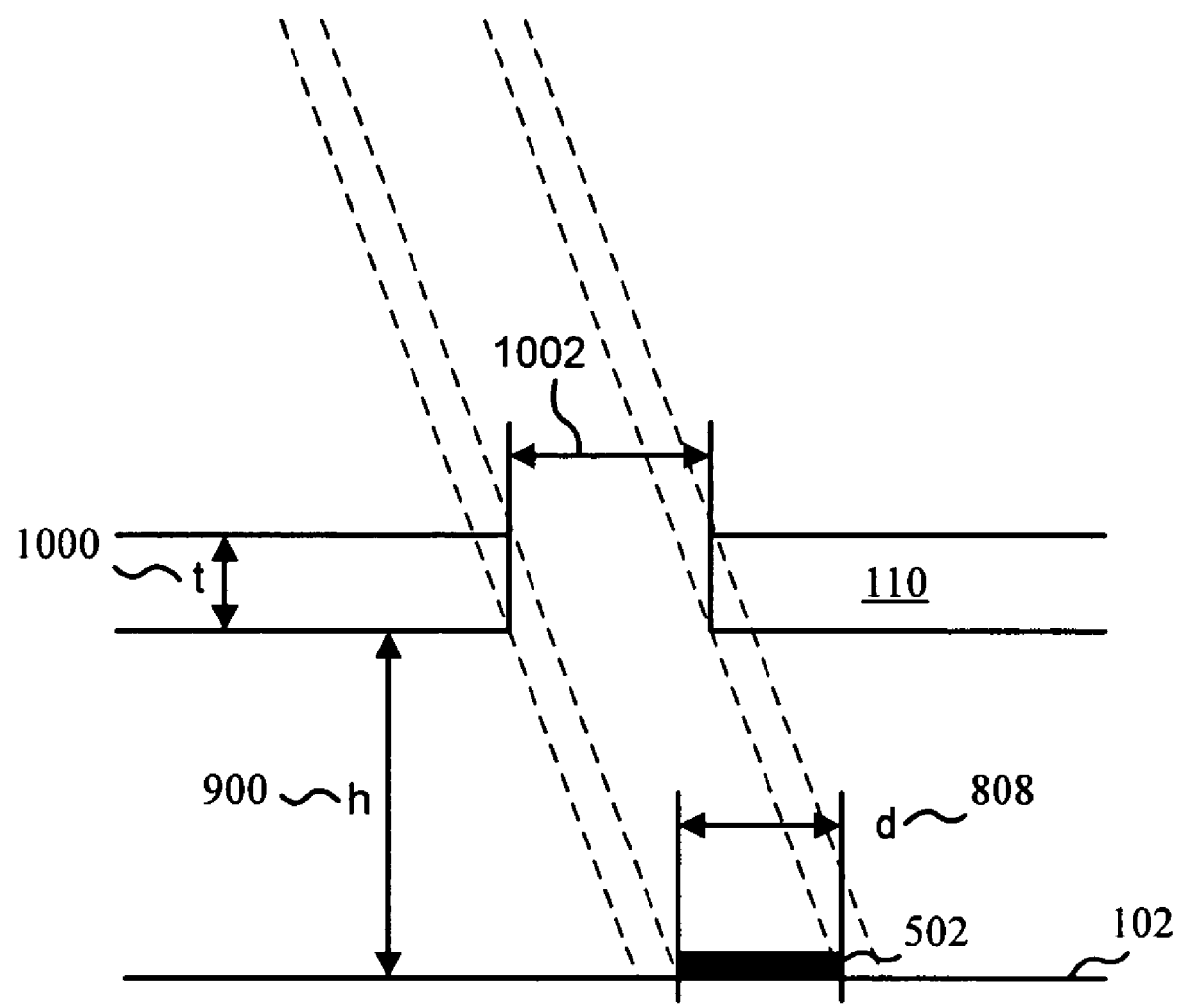
FIG. 10 is a cross-sectional view of the deposition mask and substrate of FIG. 9.
Figure 11:
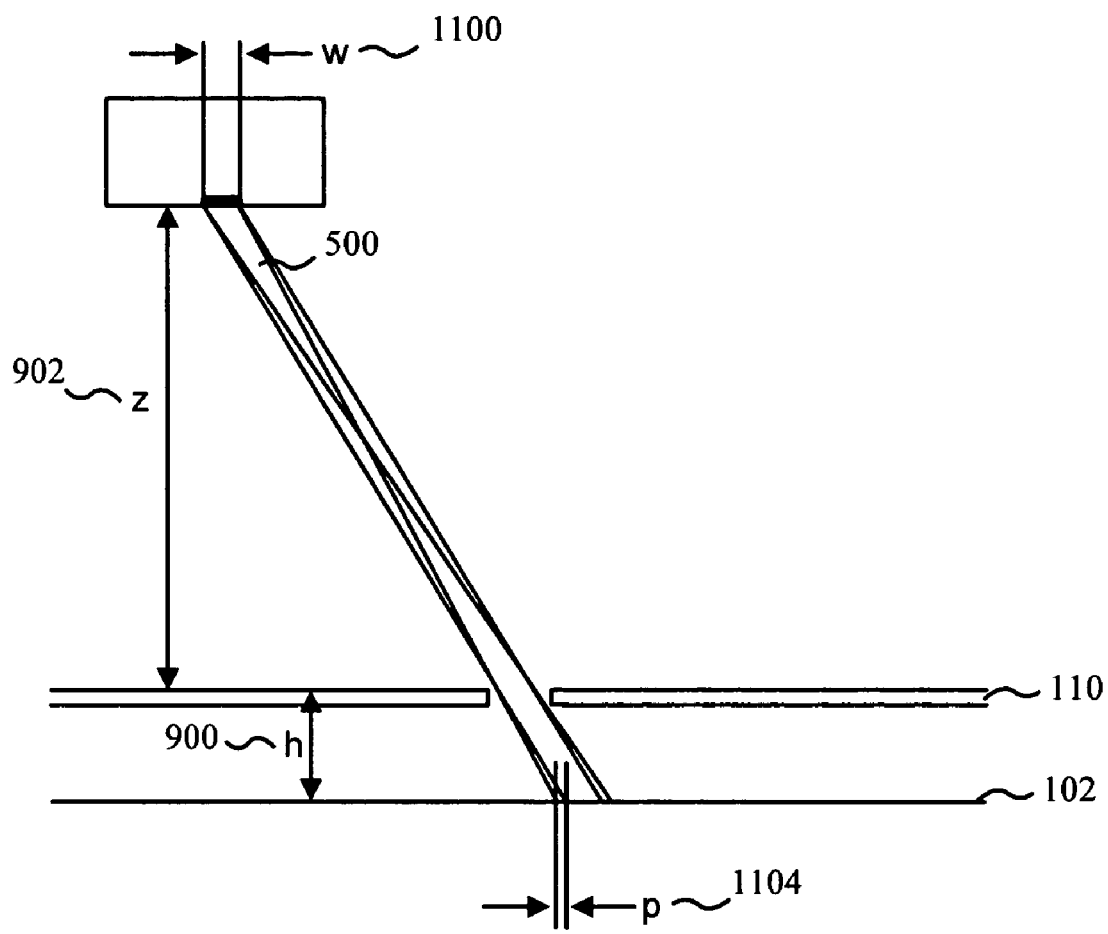
FIG. 11 is a cross-sectional view of the system of FIG. 9 illustrating a resulting penumbra.

Further, referring now to FIG. 10, a thickness ("t") 1000 of the deposition mask 110 may be equal to approximately 80 nm in the exemplary embodiment to achieve a deposition location 502 diameter ("d") 808 of 25.7 nm. Referring to FIG. 11, the width ("w") 1100 of an opening in the deposition source 300 may be approximately 2 mm to achieve a penumbra ("p") 1104, or reduced thickness of the deposition location 502, of 2.0 nm, where p is derived from the formula p=wh/z.

Figure 12:
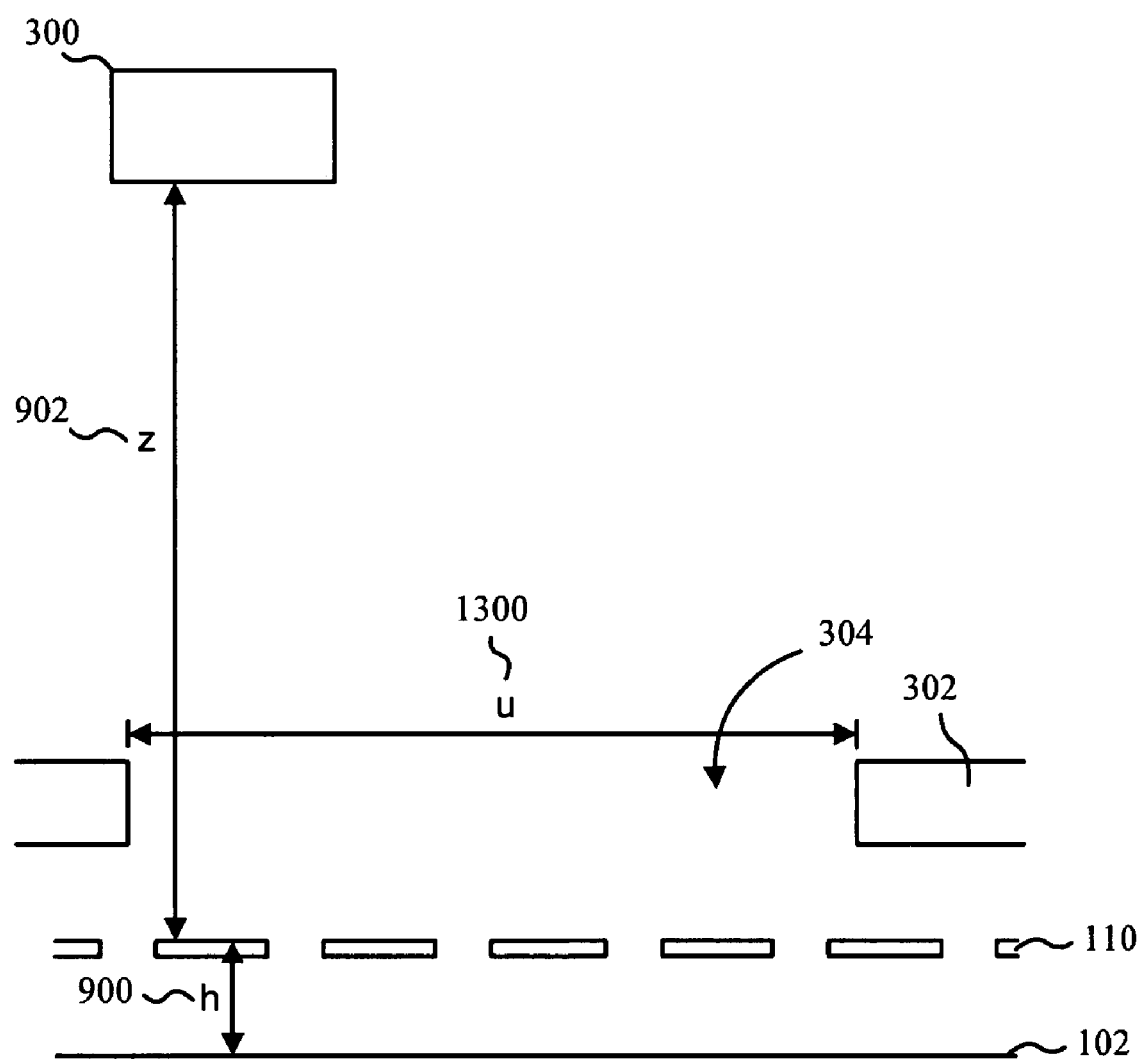
FIG. 12 is a cross-sectional view of the system of FIG. 9 including a shield in accordance with the present invention.

Referring now to FIG. 12, in the exemplary embodiment, a shield 302 may comprise a shield aperture 304 having a width ("u") 1300 calibrated to allow only a small variance in deposition angles based on the height ("z") 902 of the deposition source 300 relative to the deposition mask 110. In the present embodiment, for example, "z" 902 may be set equal to 50 cm and "u" 1300 may be set equal to 4 mm to allow an error of +/−0.23 degrees, which constrains a shift in the center of the deposition spot 502 to a range of +/−2.0 nm as a particular deposition mask 110 aperture 112 passes under the shield aperture 304 during deposition.

A reasonable set of values for the foregoing exemplary parameters, applicable to achieve a deposition pattern having a hexagonal close-packed island density equal to 500 Gbit/in², is given by the table set forth in FIG. 13.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. The order in which a particular method occurs may or may not strictly adhere to the order of the corresponding steps shown.

Figure 14:
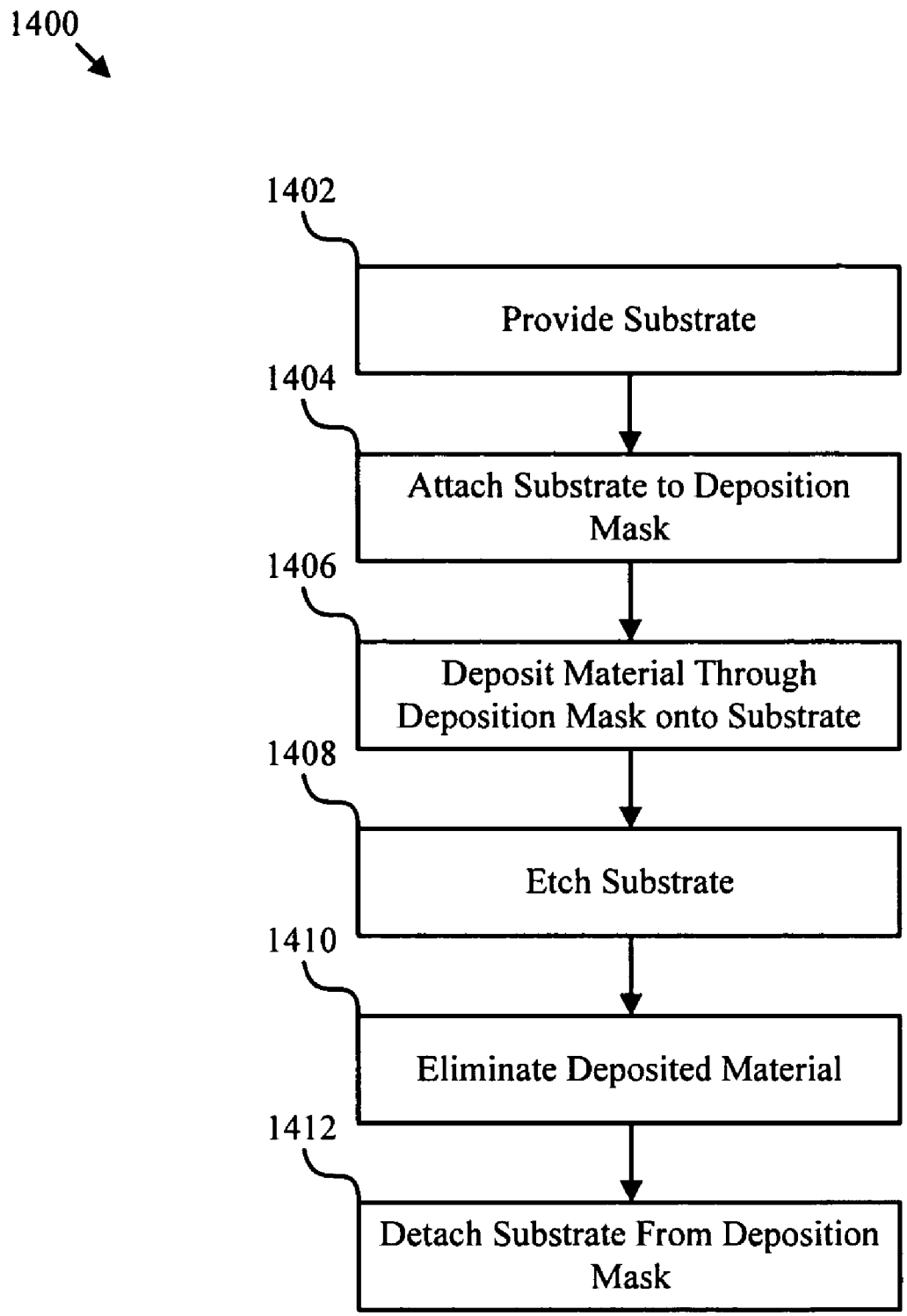
FIG. 14 is a schematic flow chart diagram of a method for fabricating a patterned media imprint master in accordance with certain embodiments of the present invention.

Referring now to FIG. 14, a method 800 for fabricating patterned media in accordance with the present invention may include providing 802 an etchable substrate, fixably attaching 804 the substrate to a deposition mask, and depositing 806 material through the deposition mask onto the substrate such that the deposited material may be used as an etch mask to etch data tracks into the surface of the substrate. A method 800 may further include etching 808 the substrate, substantially eliminating 810 deposited material from the surface of the substrate, and detaching 812 the substrate from the deposition mask to produce a patterned media imprint master.

In certain embodiments, etching 808 the substrate may include performing a plasma etch to transfer the pattern from the deposited material into the substrate. Specifically, the deposited material may be used as an etch mask, with $CF_4$ plasma used to etch a substrate or ground layer of the substrate comprising silicon nitride. Once the method of the present invention is complete, a two-generation nanoimprint replication process may be used to positively replicate the topographic data track pattern on the patterned media imprint master onto multiple disks for patterned media. The present invention thus enables fabrication of patterned media having higher data track densities, and thus increased storage capabilities, than conventional patterned media.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for fabricating patterned media, the apparatus comprising:
    a substantially planar substrate;
    a deposition mask coupled to the substrate, the deposition mask having a plurality of apertures adapted to direct a material onto the substrate;
    a deposition source positioned in a first position relative to the deposition mask such that the deposition source directs material at a first deposition angle through a single aperture of the plurality of apertures;
    wherein the deposition source is positioned to a second position relative to the deposition mask such that the deposition source directs material at a second deposition angle through the single aperture of the plurality of apertures, wherein the material is deposited at the first deposition angle and the second deposition angle through each single aperture such that two or more distinct deposit locations are formed on the substrate via each single aperture to form a plurality of concentric recording regions.

2. The apparatus of claim 1, further comprising a spacing element removably coupled to the substrate and the deposition mask, the spacing element configured to maintain a substantially fixed relationship between the substrate and the deposition mask.

3. The apparatus of claim 1, wherein the deposition source comprises at least one of a heated crucible and a cathode.

4. The apparatus of claim 1, wherein the deposition source is oriented at a substantially oblique angle of incidence relative to the substrate.

5. The apparatus of claim 1, further comprising a rotational element coupled to the substrate, the rotational element adapted to rotate the substrate and deposition mask during deposition.

6. The apparatus of claim 5, further comprising a shield proximate the deposition mask to constrain a variance in deposition angle of the material from the deposition source.

7. The apparatus of claim 6, wherein the shield comprises a substantially radial aperture corresponding to a substantially narrow portion of the substrate.

8. The apparatus of claim 1, wherein the deposition source is adapted to deposit the material from the various deposition angles in one of a simultaneous and a sequential manner.

9. The apparatus of claim 1, wherein at least one aperture of the deposition mask comprises at least one substantially angled sidewall.

10. A method for fabricating patterned media, comprising:
    providing a substantially planar substrate;
    providing a deposition mask having a plurality of apertures adapted to direct a deposition material onto the substrate;
    fixably coupling the substrate to the deposition mask;
    directionally depositing the deposition material at a first deposition angle through a single aperture of the plurality of apertures;
    directionally depositing the deposition material at a second deposition angle through the single aperture of the plurality of apertures, wherein the material is deposited at the first deposition angle and the second deposition angle through each single aperture such that two or more distinct deposit locations are formed on the substrate via each single aperture to form a plurality of concentric recording regions; and
    detaching the substrate from the deposition mask.

11. The method of claim 10, wherein fixably coupling the substrate to the deposition mask comprises removing a substantial portion of an intermediate layer between the substrate and the deposition mask.

12. The method of claim 10, further comprising:
    etching the substrate to produce data tracks substantially corresponding to the substantially concentric recording regions; and
    substantially eliminating the deposition material from the substrate.

13. The method of claim 10, wherein directionally depositing the deposition material onto the substrate comprises depositing the material from at least one substantially oblique angle of incidence.

14. The method of claim 10, wherein directionally depositing the deposition material further comprises rotating the substrate during deposition.

15. The method of claim 14, wherein directionally depositing the deposition material further comprises constraining a variance in the various deposition angles of the material.

16. The method of claim 14, wherein directionally depositing the deposition material further comprises providing a shield substantially adjacent the deposition mask to constrain a variance in the various deposition angles of the deposition material.

17. The method of claim 16, wherein providing a shield substantially adjacent the deposition mask further comprises radially disposing within the shield a substantially narrow aperture corresponding to a portion of the substrate.

18. The method of claim 10, wherein providing a deposition mask having at least one aperture comprises forming at least one angled sidewall integral to the at least one aperture.

19. A system for fabricating patterned media, comprising:
    a deposition assembly comprising a substantially planar substrate coupled to a deposition mask, the deposition mask having a plurality of apertures adapted to direct a deposition material onto the substrate;
    a first deposition source positioned in a first position relative to the deposition mask such that the deposition source directs material at a first deposition angle through a single aperture of the plurality of apertures;
    a second deposition source positioned in a second position relative to the deposition mask such that the deposition source directs material at a second deposition angle through the single aperture of the plurality of apertures, wherein the material is deposited at the first deposition angle and the second deposition angle through each single aperture such that two or more distinct deposit locations are formed on the substrate via each single aperture to form a plurality of concentric recording regions;

a rotational element coupled to the deposition assembly to rotate the substrate and the deposition mask during deposition; and a shield proximate the deposition mask to constrain a variance in the various deposition angles as the deposition material is deposited.

* * * * *